United States Patent
Sakai et al.

(10) Patent No.: US 7,298,679 B2
(45) Date of Patent: Nov. 20, 2007

(54) WRITE POWER DETERMINING METHOD AND WRITE POWER CONTROL METHOD FOR OPTICAL DISK DRIVE

(75) Inventors: Hiroharu Sakai, Tokyo (JP); Hiroyuki Hayashi, Yokohama (JP); Takashi Matsuda, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 556 days.

(21) Appl. No.: 10/814,704

(22) Filed: Mar. 30, 2004

(65) Prior Publication Data

US 2005/0094512 A1  May 5, 2005

(30) Foreign Application Priority Data

Oct. 30, 2003 (JP) ............................. 2003-371221

(51) Int. Cl.
*G11B 7/00* (2006.01)
(52) U.S. Cl. ...................... 369/47.5; 369/116
(58) Field of Classification Search ...................... None
See application file for complete search history.

(56) References Cited

U.S. PATENT DOCUMENTS 5,802,032 A * 9/1998 Jacobs et al. ............ 369/59.11
6,016,297 A * 1/2000 Nagasawa et al. ....... 369/53.28

FOREIGN PATENT DOCUMENTS

| CN | 1404044 | 3/2003 |
|---|---|---|
| JP | 07-057267 A | 3/1995 |
| JP | 2000-076684 A | 3/2000 |
| JP | 2001-307359 | 11/2001 |
| JP | 2003-016645 | 1/2003 |
| JP | 2003-173533 | 6/2003 |
| JP | 2003-248929 | 9/2003 |

* cited by examiner

*Primary Examiner*—Wayne Young
*Assistant Examiner*—Parul Gupta
(74) *Attorney, Agent, or Firm*—Townsend and Townsend and Crew LLP

(57) ABSTRACT

A write power determining method for an optical disk drive determines optimum write power information of an optical disk during the high-speed rotation of the disk. A push-pull signal amplitude is obtained at two positions in a radial direction of an optical disk before writing. A linearization value of optimum write power associated with radial positions over the whole writing area of the disk is determined on the basis of the obtained push-pull signal amplitude. The determined result is adopted as optimum write power information associated with the radial positions of the disk.

8 Claims, 5 Drawing Sheets

WRITE POWER DETERMINING METHOD AND WRITE POWER CONTROL METHOD FOR OPTICAL DISK DRIVE

BACKGROUND OF THE INVENTION

1. Field of the Invention

The present invention relates to a write power determining method and write power control method for an optical disk drive, which sets write power for writing.

2. Description of the Related Art

Writable optical disk drives including a CD-R/RW drive, and a DVD-R/RW drive ensure the writing quality by the following control: OPC (Optimum Power control) which performs test writing of test data into a PCA area of an optical disk by use of various kinds of laser power, and then calculates laser power at which the reading quality such as a β value becomes a target value; and ROPC (Running Optimum Power Control) which feedback controls laser power so that a B value indicating the quantity of return light after a write pit is formed is kept constant independent of the irregularity of coating on a recording film in an optical disk surface and also independent of the inclination of the optical disk.

Because the ROPC performs the correction in a state in which various factors of the optical disk are mixed, it does not always achieve the optimization of the writing quality, and accordingly improvements are being tried in various ways.

For example, the following technologies are known: the laser power control that keeps the ratio of fluctuations in quantity of return light to fluctuations in laser power (ΔB/ΔP) in the ROPC constant so as to keep a β value constant irrespective of the inclination of the optical disk (for example, refer to patent document 1); the laser power control that keeps Bm/Pn constant (however, m<n) (for example, refer to patent document 2); and the like.

In addition, the following example of the running OPC (for example, refer to patent document 3) is known. To be more specific, if a phase change recording optical disk such as a CD-RW is used, when overwrite is performed onto a written area, it is influenced by a state of prior writing, which makes it difficult to ensure the writing quality in the ROPC. Therefore, the influence of the overwrite is eliminated by the following steps: dividing a laser light beam into a main beam (zero-order diffracted light) and two subbeams (+1 order diffracted light and -1 order diffracted light); while irradiating a groove track with the main beam to perform writing, irradiating each land track adjacent to both sides of the groove track with the two subbeams; and performing power control of the main beam by use of return light of the land track that is not influenced by the overwriting.

Moreover, in an optical disk drive, an optical pickup, which condenses a laser light beam and irradiates a track of an optical disk with a light spot to write information into the optical disk, is usually provided with divided light receiving elements which are disposed both in a track crossing direction of the light spot and in a direction orthogonal to the track crossing direction so that focus information and tracking information can be obtained from a detection signal coming from the divided light receiving elements.

After that, a push-pull signal (PP signal) is obtained by the subtraction of a detection signal coming from the divided light receiving element in the track crossing direction of the light spot, which is one of the divided light receiving elements. In addition to it, a differential phase detection signal (DPD signal) is obtained by the phase comparison of the detection signals coming from the divided light receiving elements. The slope angle of the optical disk is then detected by both of the signals (for example, refer to patent document 4). This is the known technology.

Patent document 1: Japanese Patent Laid-open No. 2003-16645 (claim 1, 0023)

Patent document 2: Japanese Patent Laid-open No. 2003-248929 (claim 1, claim 3, 0024, 0026)

Patent document 3: Japanese Patent Laid-open No. 2003-173533 (Abstract, claim 1, Disclosure of the invention, patent document 4)

Patent document 4: Japanese Patent Laid-open No. 2001-307359 (claim 1, claim 2, 0023 through 0028, and the like)

SUMMARY OF THE INVENTION

Year by year, shortening of the writing time is increasingly requested, and in addition to the speedup of writing, high-speed rotation of an optical disk is also pressingly requested. Under such circumstances, it becomes difficult to achieve the high accuracy of detection at the time when the ROPC detects the quantity of return light to ensure the writing quality.

An object of the present invention is to provide a write power determining method of an optical disk drive, which can determine optimum write power information of an optical disk during the high-speed rotation of the optical disk.

Another object of the present invention is to provide a write power control method of an optical disk drive, which controls laser power at the time of writing by use of the optimum write power information of the optical disk that has been determined beforehand.

Still another object of the present invention is to provide a write power control method of an optical disk drive, which determines optimum write power information of an optical disk during the high speed rotation of the optical disk before writing and then controls laser power at the time of writing by use of the determined optimum write power information.

A write power determining method of an optical disk drive according to claim 1 of the present invention is characterized by comprising the steps of:

obtaining the push-pull signal amplitude at at least two measuring positions in a radial direction of an optical disk before writing;

on the basis of the obtained push-pull signal amplitude, determining optimum write power associated with radial positions over the whole writing area of the disk by computation; and adopting the determined result as optimum write power information associated with the radial positions of the disk.

A write power control method of an optical disk drive according to claim 2 of the present invention is characterized by comprising the steps of:

obtaining disk position information of an optical pickup at the time of writing;

with reference to the obtained disk position information and stored optimum write power information associated with a disk radial position, setting optimum write power at a writing position of an optical disk; and controlling laser power of the optical pickup so as to become the set optimum write power.

A write power control method of an optical disk drive according to claim 3 of the present invention is characterized by comprising the steps of:

obtaining the push-pull signal amplitude at at least two positions in a radial direction of an optical disk before writing;

on the basis of the obtained push-pull signal amplitude, determining optimum write power associated with radial positions over the whole writing area of the disk by computation;

adopting the determined result as optimum write power information associated with the radial positions of the disk, and then storing the optimum write power information;

obtaining disk position information of an optical pickup at the time of writing;

with reference to the obtained disk position information and the stored optimum write power information associated with the radial position of the disk, setting optimum write power at a writing position of the disk; and controlling laser power of the optical pickup so as to become the set optimum write power.

A write power determining method or write power control method for an optical disk drive cited in claim 4 of the present invention, according to claim 1, 2, or 3 is characterized in that:

with respect to the optimum write power information associated with the radial position of the disk, if the optimum write power at an arbitrary outer circumferential measuring position relative to an inner circumferential reference measuring position is defined as PO, PO is calculated and determined by an equation of:

$$PO=[1+\{(PPI/PPO)-1\} \times PUP] \times PI$$

or $$PO=[1+\{1-(PPO/PPI)\} \times PUP] \times PI$$

where:

PPI: the push-pull signal amplitude obtained at the inner circumferential reference measuring position or at a position in proximity to the inner circumferential reference measuring position;

PPO: the push-pull signal amplitude obtained at the arbitrary outer circumferential measuring position;

PUP: a ratio coefficient of power up based on a disk radius; and

PI: the optimum write power by test writing at the inner circumferential reference measuring position.

A write power determining method or a write power control method for an optical disk drive cited in claim 5, according to claim 4, is characterized in that:

with respect to the optimum write power information associated with the radial position of the disk, if the optimum write power at an arbitrary outer circumferential non-measuring position is defined as P, P is or has been calculated and determined by an equation of:

$$P=(PI-PO)/(ri-ro) \times r+(PO \times ri-PI \times ro)/(ri-ro)$$

where:

ri: a disk radial position associated with the inner circumferential reference measuring position or a position in proximity to the inner circumferential reference measuring position; and ro: a disk radial position corresponding to the arbitrary outer circumferential measuring position at which the PPO described in claim 4 is obtained.

A write power determining method or write power control method for an optical disk drive cited in claim 6, according to claim 1, 2, or 3, is characterized in that:

with respect to the optimum write power information associated with the radial position of the disk, if the optimum write power at the arbitrary outer circumferential measuring position relative to the inner circumferential reference measuring position is defined as PO, PO is or has been calculated and determined by an equation of:

$$PO=[1+\{(PPI/PPO)-1\} \times PUP] \times Pr$$

or $$PO=[1+\{1-(PPO/PPI)\} \times PUP] \times Pr$$

where:

PPI: the push-pull signal amplitude obtained at the inner circumferential reference measuring position or at a position in proximity to the inner circumferential reference measuring position;

PPO: the push-pull signal amplitude obtained at the arbitrary outer circumferential measuring position;

PUP: a ratio coefficient of power up based on a disk radius; and

Pr: the optimum power associated with a disk radial distance of r at the arbitrary outer circumferential position at the time when there is no difference in push-pull amplitude between the inner circumferential position and the outer circumferential position.

A write power determining method or write power control method for an optical disk drive cited in claim 7, according to claim 6, is characterized in that:

with respect to the optimum write power information associated with the disk radial position, if the optimum write power at the arbitrary outer circumferential position relative to the inner circumferential reference position is defined as Prb, Prb is or has been calculated and determined by equations of:

$$Prb=PCR \times Pr$$

where:

Pr: the optimum power associated with a disk radial distance of r at the arbitrary outer circumferential position at the time when there is no difference in push-pull amplitude between the inner circumferential position and the outer circumferential position; and PCR: a power control coefficient associated with a disk radius of r at the arbitrary outer circumferential non-measuring position of the optical pickup, $$PCR=\{(PCI-PCO)/(ri-ro)\} \times r+\{(PCO \times ri)-(PCI \times ro)\}/(ri-ro)$$

where:

ri is a disk radial distance at the inner circumferential reference measuring position or at a position in proximity to the inner circumferential reference measuring position;

ro: a disk radial distance at the arbitrary outer circumferential position;

PCI: a power control coefficient at the inner circumferential reference measuring position or a position in proximity to the inner circumferential reference measuring position; and PCO: a power control coefficient at the arbitrary outer circumferential measuring position, $$PCI=1$$

$$PCO=[1+\{(PPI/PPO)-1\} \times PUP]$$

or $$PCO=[1+\{1-(PPO/PPI)\} \times PUP]$$

According to the present invention, it is possible to provide a write power determining method for an optical disk drive, which can determine optimum write power information of an optical disk during the high-speed rotation of the optical disk. In addition, according to the present invention, it is possible to provide a write power control method for an optical disk drive, which controls laser power at the time of writing by use of the optimum write power information of the optical disk that has been determined beforehand. Moreover, according to the present invention, it is possible to provide a write power control method of an optical disk drive, which determines optimum write power information of an optical disk during the high speed rotation of the optical disk before writing and then controls laser power at the time of writing by use of the determined optimum write power information.

DESCRIPTION OF THE PREFERRED EMBODIMENTS

Preferred embodiments according to the present invention will be described with reference to the drawings.

Figure 1:
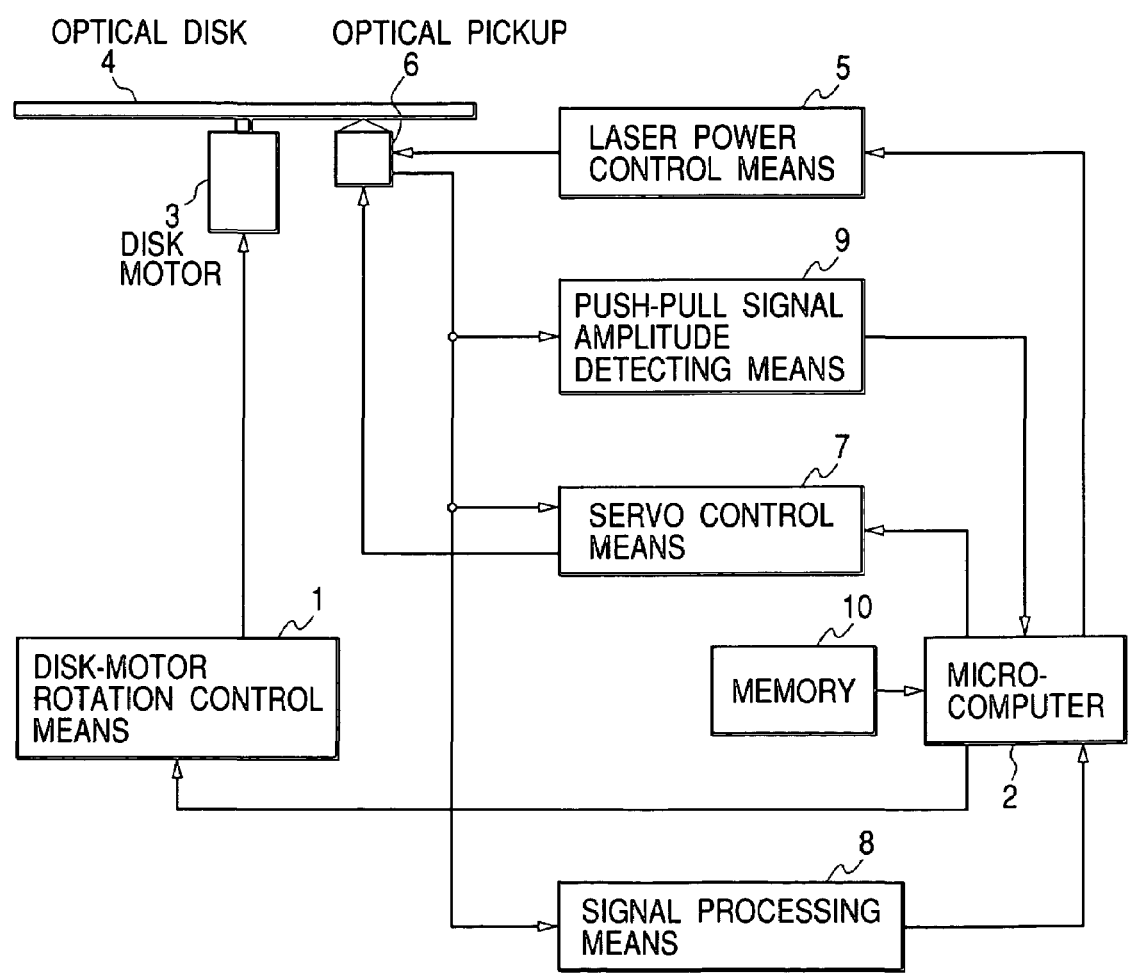
FIG. 1 is a configuration diagram illustrating an embodiment of an optical disk drive having a write-power setting method according to the present invention.

FIG. 1 is a configuration diagram illustrating an embodiment of an optical disk drive having a write-power setting method according to the present invention.

In FIG. 1, a disk-motor rotation control means 1 controls a disk motor 3 so that the number of revolutions becomes a value specified by a microcomputer 2. The disk motor 3 rotates an optical disk 4.

A laser power control means 5 controls laser power of an optical pickup 6 so as to become a value set by the microcomputer 2.

The optical pickup 6 condenses a laser light beam for the optical disk 4 to perform information writing operation. In addition, the optical pickup 6 detects, as optical information, information written into the optical disk 4, and then converts the optical information into an electric signal.

Here, the optical pickup 6 comprises divided light receiving elements disposed both in a track crossing direction of a light spot, which condenses a laser light beam and irradiates a track of the optical disk with the laser light beam, and in a direction orthogonal to the track crossing direction. The optical pickup 6 outputs a detection signal coming from the divided light receiving elements.

On receipt of an instruction from the microcomputer 6, a servo control means 7 extracts focus information and tracking information, which are required for disk information groove following operation by the optical pickup 6, from a detection signal coming from the divided light receiving elements of the optical pickup 6. Then, the servo control means 7 performs focus/tracking following operation of the optical pickup 6 according to the extracted information.

A signal processing means 8 reads out by the optical pickup 6 for example ATIP address information, which is position information written into the optical disk 4, from the optical disk 4 to obtain position information of the optical pickup 6. In addition, the signal processing means 8 obtains, on an optical disk basis, medium ID information that is added to a CD-R optical disk, or the like.

A push-pull signal amplitude detecting means 9 detects the push-pull signal amplitude through subtraction using a detection signal coming from the divided light-receiving element in the track crossing direction of the light spot, which is one of the divided light receiving elements of the optical pickup 6.

On the basis of the push-pull signal amplitude from the push-pull signal amplitude detecting means 9, a memory 10 stores optimum write power information associated with radial positions of the disk, which is calculated by the microcomputer 2.

At the time of writing, referring to position information of the optical pickup 6, which has been obtained by the signal processing means 8, and also referring to the optimum write power information associated with a disk radial position, which are stored in the memory 10, the microcomputer 2 sets optimum write power associated with a writing radial position of the optical pickup 6. The microcomputer 2 then instructs the laser power control means 5 to achieve the set optimum write power. After that, according to the instruction of the microcomputer 2, the laser power control means 5 controls the laser power of the optical pickup 6 so as to become the set optimum write power.

Figure 2:
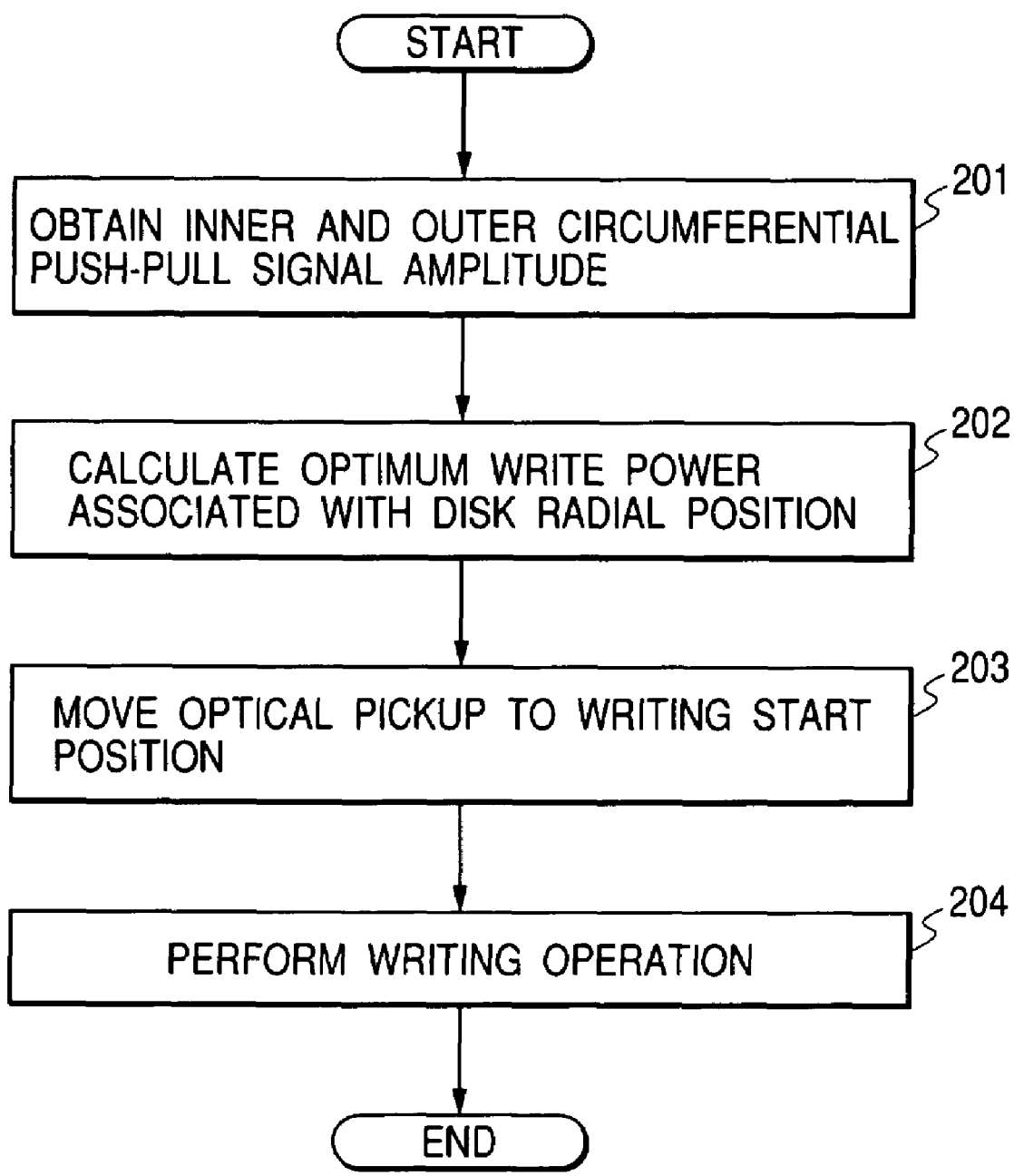
FIG. 2 is a flowchart illustrating the whole operation of writing shown in FIG. 1.

FIG. 2 is a flowchart illustrating the whole operation relating to writing performed by the optical disk drive shown in FIG. 1.

In FIG. 2, steps 201 and 202 are performed before writing. In the step 201, the microcomputer 2 moves the optical pickup 6 to two positions in the radial direction of the optical disk 4: more specifically, an inner circumferential position (for example, a position corresponding to a radial distance of 23 mm from the inside); and an outer circumferential position (for example, a position corresponding to a radial distance of 50 mm from the inside). The microcomputer 2 then obtains the push-pull signal amplitude at the positions from the push-pull signal obtaining means 9.

In the step 202, the microcomputer 2 calculates and determines the optimum write power associated with the radial positions over the whole disk writing area on the basis of the push-pull signal amplitude information obtained at both the inner circumferential measuring position and the outer circumferential measuring position in the step 201. After that, the microcomputer 2 adopts the calculated result as optimum write power information associated with the disk radial positions, and then stores the optimum write power information in the memory 10.

In a step 203, at the time of writing, the microcomputer 2 moves the optical pickup 6 to a writing start position in the radial direction of the optical disk 4. After that, the microcomputer 2 sets the write power associated with the writing start position by use of the optimum write power information associated with a disk radial position, which is stored in the memory 10. Then, as soon as the writing starts, the laser power control means 5 instructs the optical pickup 6 to emit a laser light beam with the set write power.

In the step 204, actual writing operation is performed by the optical pickup 6.

Figure 3:
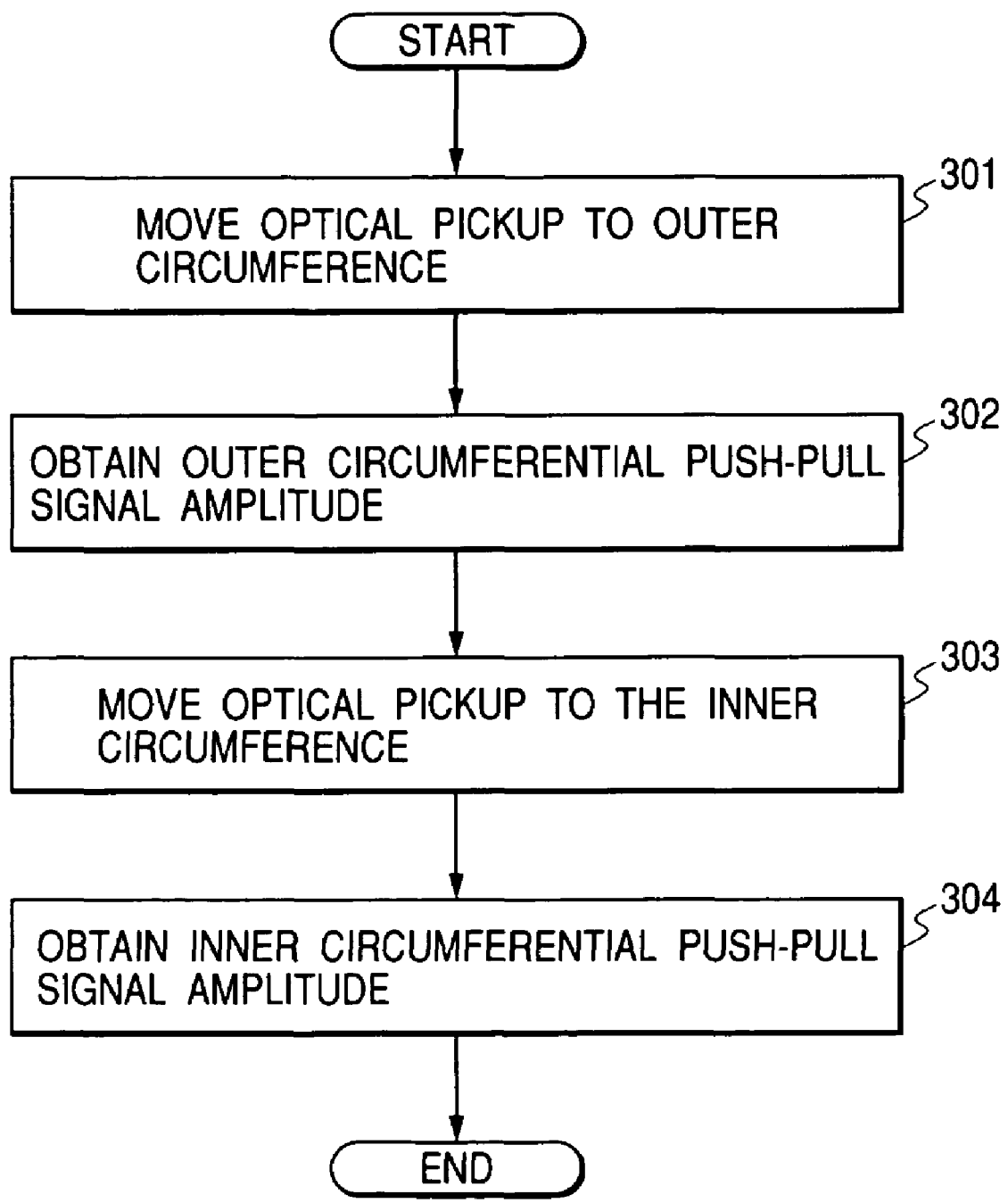
FIG. 3 is a diagram illustrating an example of a detailed flow of a step 201 shown in FIG. 2.

FIG. 3 is a diagram illustrating an example of a detailed flow of the step 201 shown in FIG. 2.

In a step 301, the microcomputer 2 moves the optical pickup 6 to the outer circumferential measuring position, which is one of the two measuring positions in the radial direction of the optical disk 4: more specifically, the inner circumferential measuring position and the outer circumferential measuring position.

In a step 302, the microcomputer 2 obtains the push-pull signal amplitude at the outer circumferential measuring position from the push-pull signal obtaining means 9.

In a step 303, the microcomputer 2 moves the optical pickup 6 to the inner circumferential measuring position, which is one of the two measuring positions in the radial direction of the optical disk 4: more specifically, the inner circumferential measuring position and the outer circumferential measuring position.

In a step 304, the microcomputer 2 obtains the push-pull signal amplitude at the inner circumferential measuring position from the push-pull signal obtaining means 9.

Up to this point, the detailed flow of the step 201 in FIG. 2 has been described.

In this embodiment, the amplitude at the inner circumferential measuring position is obtained after the outer circumferential measuring position has been obtained. However, the amplitude at the inner circumferential measuring position may also be first obtained. In this case, the order of flow is the step 303, the step 304, the step 301, and the step 302.

Here, at the time of acquisition of the push-pull signal amplitude in the steps 302 and 304, to begin with, tracking-off operation achieves a state in which a change in signal in a track crossing direction (traverse direction) of the optical disk can be measured as the push-pull amplitude.

Next, the actual push-pull amplitude is measured and obtained. Lastly, tracking is turned on again.

If necessary, until the number of revolutions of the disk at the measuring position becomes substantially the same as the number of revolutions of the disk at the time of writing, processing of waiting for measurement may also be provided in an arbitrary process before actually measuring and obtaining the push-pull amplitude. Incidentally, because the amount of warping of the disk changes with the number of revolutions of the optical disk, it is desirable to use the push-pull amplitude obtained when the number of revolutions becomes the same as the writing speed.

Figure 4:
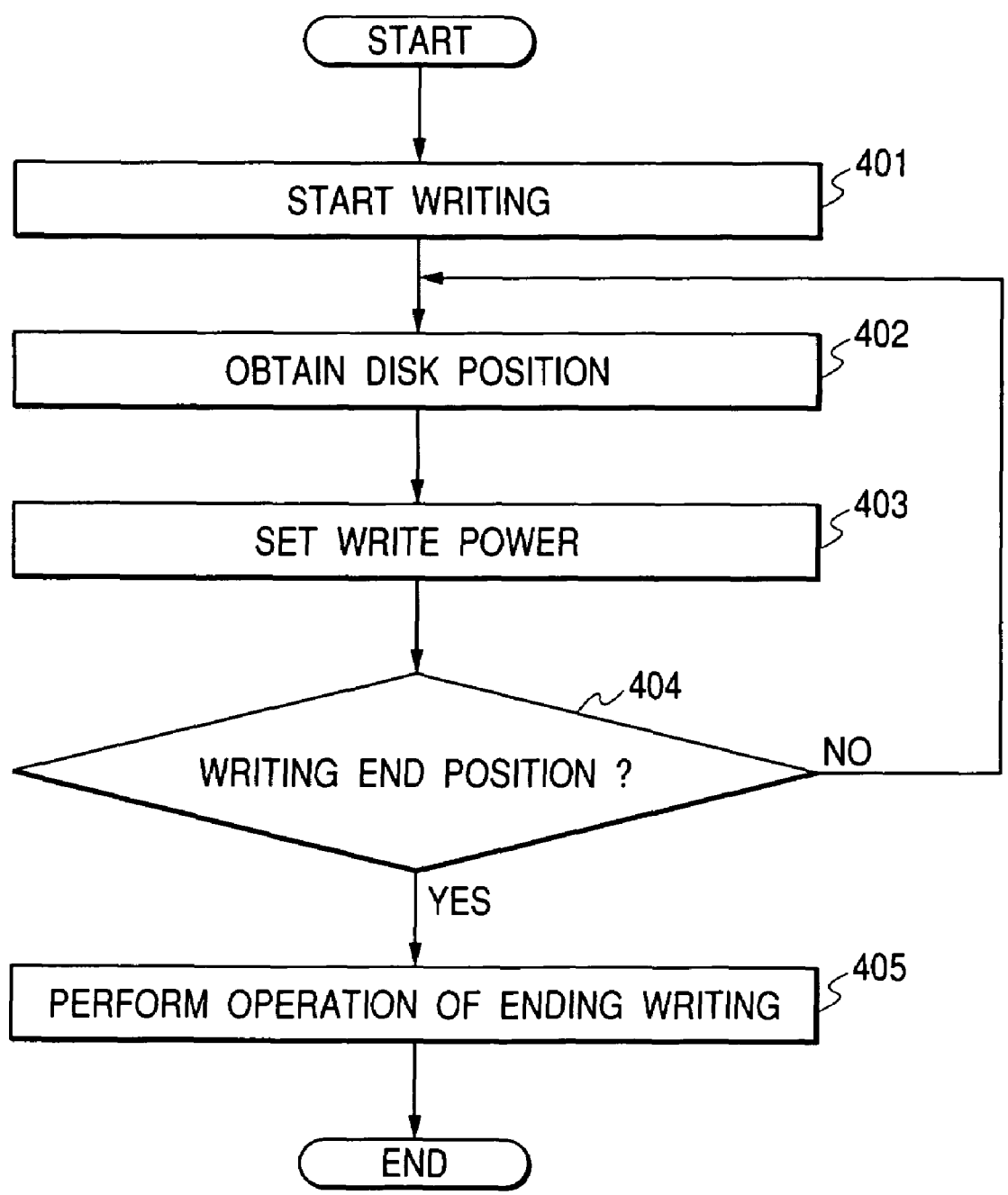
FIG. 4 is a diagram illustrating an example of a detailed flow of a step 204 shown in FIG. 2.

FIG. 4 is a diagram illustrating an example of a detailed flow of the step 204 shown in FIG. 2.

In a step 401, writing is started at a writing start position in the radial direction of the optical disk 4.

In the step 402, the microcomputer 2 obtains ATIP address information from the signal processing means 8, and then obtains disk position information of the optical pickup 6.

In a step 403, referring to the disk position information of the optical pickup 6, which has been detected in the step 402, and also referring to the optimum write power information at the disk radial positions, which are stored in the memory 10, the microcomputer 2 sets optimum write power associated with a writing position of the optical disk 4, and then instructs the laser power control means 5 to achieve the set optimum write power. After that, according to the instruction of the microcomputer 2, the laser power control means 5 controls laser power of the optical pickup 6 so as to become the set optimum write power.

In a step 404, referring to the position information of the optical pickup 6, which has been obtained by the signal processing means 8, the microcomputer 2 makes a judgment as to whether or not a current position is the writing end position. If it is not the writing end position, the process returns to the step 402 to continue the writing. If the current position is the writing end position, operation of ending the writing is performed in a step 405.

Next, detailed contents of the step 202 in FIG. 2 will be described.

In the first place, it is assumed that the whole surface of the optical disk is written at the same speed (CLV writing). As regards the optimum write power information associated with the disk radial positions, if the optimum write power associated with an arbitrary outer circumferential measuring position relative to an inner circumferential reference measuring position is defined as PO, PO can be expressed as follows:

$$PO=[1+\{(PPI/PPO)-1\} \times PUP] \times PI \quad \text{(Equation 1)}$$

or $$PO=[1+\{1-(PPO/PPI)\} \times PUP] \times PI \quad \text{(Equation 2)}$$

where:

PPI: the push-pull signal amplitude obtained at the inner circumferential reference measuring position or at a position in proximity to the inner circumferential reference measuring position;

PPO: the push-pull signal amplitude obtained at the arbitrary outer circumferential measuring position;

PUP: a ratio coefficient of power up based on a disk radius; and

PI: the optimum write power by test writing at the inner circumferential reference measuring position.

Here, the equation 1 is an equation of the optimum write power PO with reference to an increasing rate of PPI at the inner circumferential reference measuring position or at a position in proximity to the inner circumferential reference measuring position, which are associated with PPO for the arbitrary outer circumferential measuring position.

In addition, the equation 2 is an equation of optimum write power PO with reference to an decreasing rate of PPO at an arbitrary outer circumferential measuring position associated with PPI at the inner circumferential reference measuring position or at a position in proximity to the inner circumferential reference measuring position.

Incidentally, it is desirable to study in advance an optimum value of a ratio coefficient of power up based on a disk radius of the PUP on a medium basis.

Moreover, it may also be so devised that the result of the study relating to the PUP on a medium basis is stored in the memory 10, and that the result of the study is read out from the memory 10 before the actual calculation.

Figure 5:
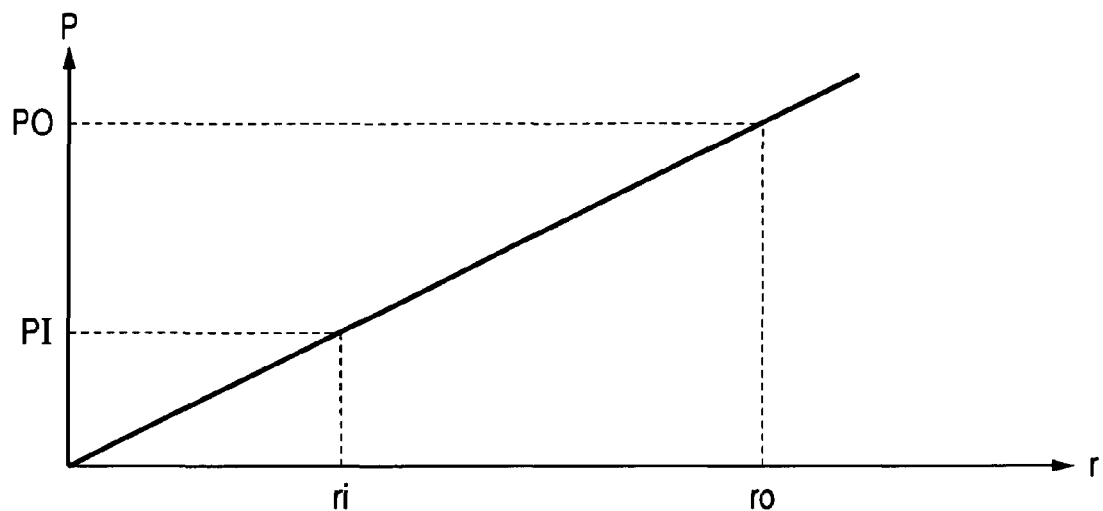
FIG. 5 is a diagram illustrating the relationship between the write power and a disk radius at the time of CLV in a step 202 shown in FIG. 2.

Here, the optimum write power at an arbitrary outer circumferential non-measuring position is defined as P; a disk radial distance of the arbitrary outer circumferential non-measuring position is defined as r; a disk radial distance of the inner circumferential reference measuring position is defined as ri; and a disk radial distance of an arbitrary outer circumferential measuring position is defined as ro. On the basis of the above-mentioned definitions, as shown in FIG. 5, if the disk radial distance r of the arbitrary outer circumferential non-measuring position and the optimum write power P at the arbitrary outer circumferential non-measuring position can approximate to a linear expression, the linear expression can be expressed as follows:

$$P=(PI-PO)/(ri-ro) \times r+(PO \times ri-PI \times ro)/(ri-ro) \quad \text{(Equation 3)}$$

Here, PO is denoted by the above-mentioned equations 1 or 2.

Next, a case where the whole surface of the optical disk is written by CAV-writing will be described. In the case of CAV, the reading/writing speed changes with a radial position. In addition, optimum write power changes in response to the reading/writing speed. Accordingly, the optimum power on a reading/writing speed basis (on a radial position basis) is further corrected by information on the deference in push-pull amplitude.

If the optimum write power at an arbitrary outer circumferential measuring position relative to an inner circumferential reference measuring position is defined as PO, PO is calculated by the following equation:

$$PO=[1+\{(PPI/PPO)-1\}\times PUP]\times Pro$$

or $$PO=[1+\{1-(PPO/PPI)\}\times PUP]\times Pro$$

where:
PPI: the push-pull signal amplitude obtained at the inner circumferential reference measuring position or at a position in proximity to the inner circumferential reference measuring position;
PPO.: the push-pull signal amplitude obtained at the arbitrary outer circumferential measuring position;
PUP: a ratio coefficient of power up based on a disk radius; and
Pro: the optimum write power associated with a disk radial distance of ro at an arbitrary outer circumferential measuring position at the time when there is no difference in push-pull amplitude between the inner circumferential position and the outer circumferential position.

The optimum write power Prb at a non-measuring position is optimum write power obtained by the power correction of Pr according to this invention. The relationship between Prb and Pr is expressed by the following equation:

$$Prb=PCR\times Pr \quad \text{(Equation 4)}$$

where PCR is a power control coefficient associated with a disk radial distance of r at an arbitrary outer circumferential non-measuring position of the optical pickup.

As for the PCR associated with a disk radial distance of r at the arbitrary outer circumferential non-measuring position of the optical pickup, the PCR can be expressed by use of PCI which is the power control coefficient at the inner circumferential reference measuring position and PCO which is the power control coefficient at the arbitrary outer circumferential measuring position.

Here, $$PCI=1 \quad \text{(Equation 5)}$$

$$PCO=[1+\{(PPI/PPO)-1\}\times PUP] \quad \text{(Equation 6)}$$

or $$PCO=[1+\{1-(PPO/PPI)\}\times PUP] \quad \text{(Equation 7)}$$

The equations 6 and 7 are coefficient terms of the equations 1 and 2 respectively.

Figure 6:
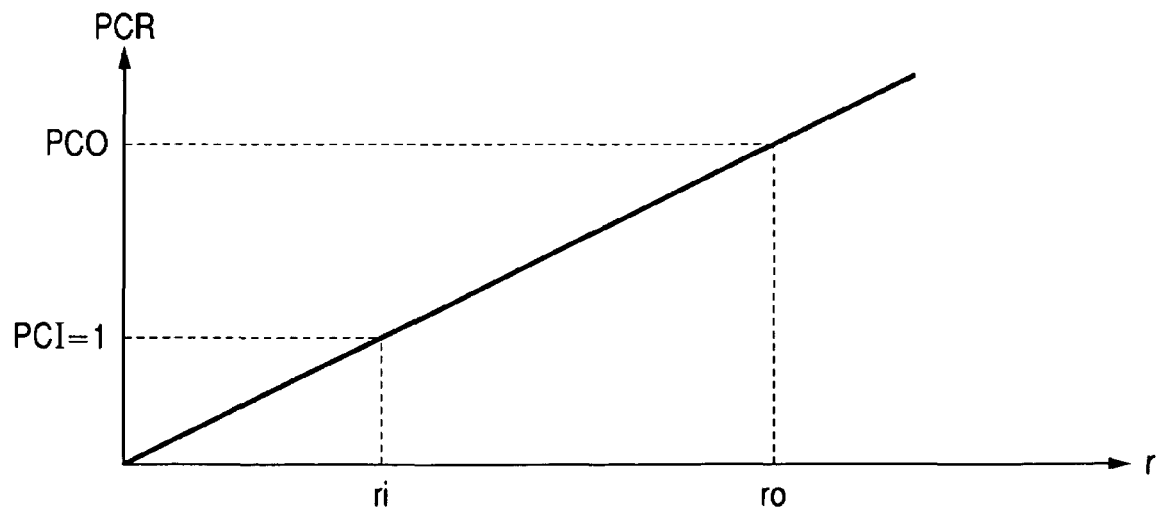
FIG. 6 is a diagram illustrating the relationship between a power control coefficient PCR and a disk radius at the time of CAV in a step 202 shown in FIG. 2.

According to the linearization as shown in FIG. 6, PCR is expressed as follows:

$$PCR=\{(PCI-PCO)/(ri-ro)\}\times r+\{(PCO\times ri)-(PCI\times ro)\}/(ri-ro) \quad \text{(Equation 8)}$$

where:
ri is a disk radial distance at the inner circumferential reference measuring position or at a position in proximity to the inner circumferential reference measuring position; and
ro is a disk radial distance at an arbitrary outer circumferential measuring position.

It is to be noted that the optimum write power at each read position (each read speed), which has been determined by use of known OPC, ROPC, and the like, other than the present invention, may also be used as the optimum write power Pr associated with a disk radial distance of r at an arbitrary outer circumferential non-measuring position.

Incidentally, the equation 4 can be applied not only to CAV but also to the above-mentioned CLV, ZCLV, and the like. In addition, by use of the equation 4, it is also possible to further correct the optimum power determined by the power control of ROPC, or the like, other than the present invention.

As described above, according to the embodiments of the present invention, it is possible to provide a write power determining method of an optical disk drive, which can determine optimum write power information of an optical disk during the high speed rotation of the optical disk.

Moreover, according to the embodiments of the present invention, it is possible to provide a write power control method of an optical disk drive, which controls laser power at the time of writing by use of the optimum write power information of the optical disk that has been determined beforehand.

Furthermore, according to the embodiments of the present invention, it is possible to provide a write power control method of an optical disk drive, which determines optimum write power information of an optical disk during the high speed rotation of the optical disk before writing and then controls laser power at the time of writing by use of the determined optimum write power information.

The invention claimed is:

1. A write power determining method of an optical disk inserted in an optical disk drive before writing to the inserted optical disk, the method comprising:
   obtaining a push-pull signal amplitude at at least two measuring positions, including an inner circumferential portion and an outer circumferential portion of a recording surface, in a radial direction of the inserted optical disk;
   determining a relationship of an optimum write power with respect to a radial position of the inserted disk based on the obtained push-pull signal; and
   controlling the optimum write power depending on the radial position of the inserted optical disk based on the determined relationship;
   wherein, with respect to the optimum write power information associated with the radial position of the disk, if the optimum write power at an arbitrary outer circumferential measuring position relative to an inner circumferential reference measuring position is defined as PO, PO is calculated and determined by an equation of:

$$PO=[1+\{(PPI/PPO)-1\}\times PUP]\times PI$$

or $$PO=[1+\{1-(PPO/PPI)\}\times PUP]\times PI$$

where:
PPI: the push-pull signal amplitude obtained at the inner circumferential reference measuring position or at a position in proximity to the inner circumferential reference measuring position;
PPO: the push-pull signal amplitude obtained at the arbitrary outer circumferential measuring position;
PUP: a ratio coefficient of power up based on a disk radius; and
PI: the optimum write power by test writing at the inner circumferential reference measuring position.

2. The write power determining method of claim 1, wherein:
with respect to the optimum write power information associated with the radial position of the disk, if the optimum write power of a disk of radius r at an arbitrary outer circumferential non-measuring position is defined as P, P is or has been calculated and determined by an equation of:

$$P=(PI-PO)/(ri-ro) \times r+(PO \times ri-PI \times ro)/(ri-ro)$$

where:
ri: a disk radial position associated with the inner circumferential reference measuring position or a position in proximity to the inner circumferential reference measuring position; and
ro: a disk radial position corresponding to the arbitrary outer circumferential measuring position at which the PPO described in claim 1 is obtained.

3. A write power determining method of an optical disk inserted in an optical disk drive before writing to the inserted optical disk, the method comprising:
obtaining a push-pull signal amplitude at at least two measuring positions, including an inner circumferential portion and an outer circumferential portion of a recording surface, in a radial direction of the inserted optical disk;
determining a relationship of an optimum write power with respect to a radial position of the inserted disk based on the obtained push-pull signal; and
controlling the optimum write power depending on the radial position of the inserted optical disk based on the determined relationship;
wherein, with respect to the optimum write power information associated with the radial position of the disk, if the optimum write power at the arbitrary outer circumferential measuring position relative to the inner circumferential reference measuring position is defined as PO, PO is or has been calculated and determined by an equation of:

$$PO=[1+\{(PPI/PPO)-1\} \times PUP] \times Pro[Pr]$$

or $$PO=[1+\{1-(PPO/PPI)\} \times PUP] \times Pro[Pr]$$

where:
PPI: the push-pull signal amplitude obtained at the inner circumferential reference measuring position or at a position in proximity to the inner circumferential reference measuring position;
PPO: the push-pull signal amplitude obtained at the arbitrary outer circumferential measuring position;
PUP: a ratio coefficient of power up based on a disk radius; and
Pro: the optimum power associated with a disk radial distance of ro at the arbitrary outer circumferential measuring position at the time when there is no difference in push-pull amplitude between the inner circumferential position and the outer circumferential position.

4. The write power determining method of claim 3, wherein:
with respect to the optimum write power information associated with the disk radial position, if the optimum write power at the arbitrary outer circumferential non-measuring position relative to the inner circumferential reference position is defined as Prb, Prb is or has been calculated and determined by equations of:

$$Prb=PCR \times Pr$$

where:
Pr: the optimum power associated with a disk radial distance of r at the arbitrary outer circumferential non-measuring position at the time when there is no difference in push-pull amplitude between the inner circumferential position and the outer circumferential position; and
PCR: a power control coefficient associated with a disk radius of r at the arbitrary outer circumferential non-measuring position of the optical pickup, $$PCR=\{(PCI-PCO)/(ri-ro)\} \times r+\{(PCO \times ri)-(PCI \times ro)\}/(ri-ro)$$

where:
ri is a disk radial distance at the inner circumferential reference measuring position or at a position in proximity to the inner circumferential reference measuring position;
ro: a disk radial distance at the arbitrary outer circumferential measuring position;
PCI: a power control coefficient at the inner circumferential reference measuring position or a position in proximity to the inner circumferential reference measuring position; and
PCO: a power control coefficient at the arbitrary outer circumferential measuring position, $$PCI=1$$

$$PCO=[1+\{(PPI/PPO)-1\} \times PUP]$$

or $$PCO=[1+\{1-(PPO/PPI)\} \times PUP].$$

5. The write power determining method of claim 1, wherein the relationship of the optimum write power with respect to the radial position is determined with an interpolation between an optimum write power obtained in the inner circumferential portion and the outer circumferential portion of the inserted optical disk.

6. The write power determining method of claim 1, further comprising storing information associated with the optimum write power into memory.

7. The write power determining method of claim 3, wherein the relationship of the optimum write power with respect to the radial position is determined with an interpolation between an optimum write power obtained in the inner circumferential portion and the outer circumferential portion of the inserted optical disk.

8. The write power determining method of claim 3, further comprising storing information associated with the optimum write power into memory.

* * * * *